April 27, 1937.    W. J. WISNIEWSKI    2,078,703
VEHICLE BRAKE
Filed Sept. 21, 1936    2 Sheets-Sheet 2
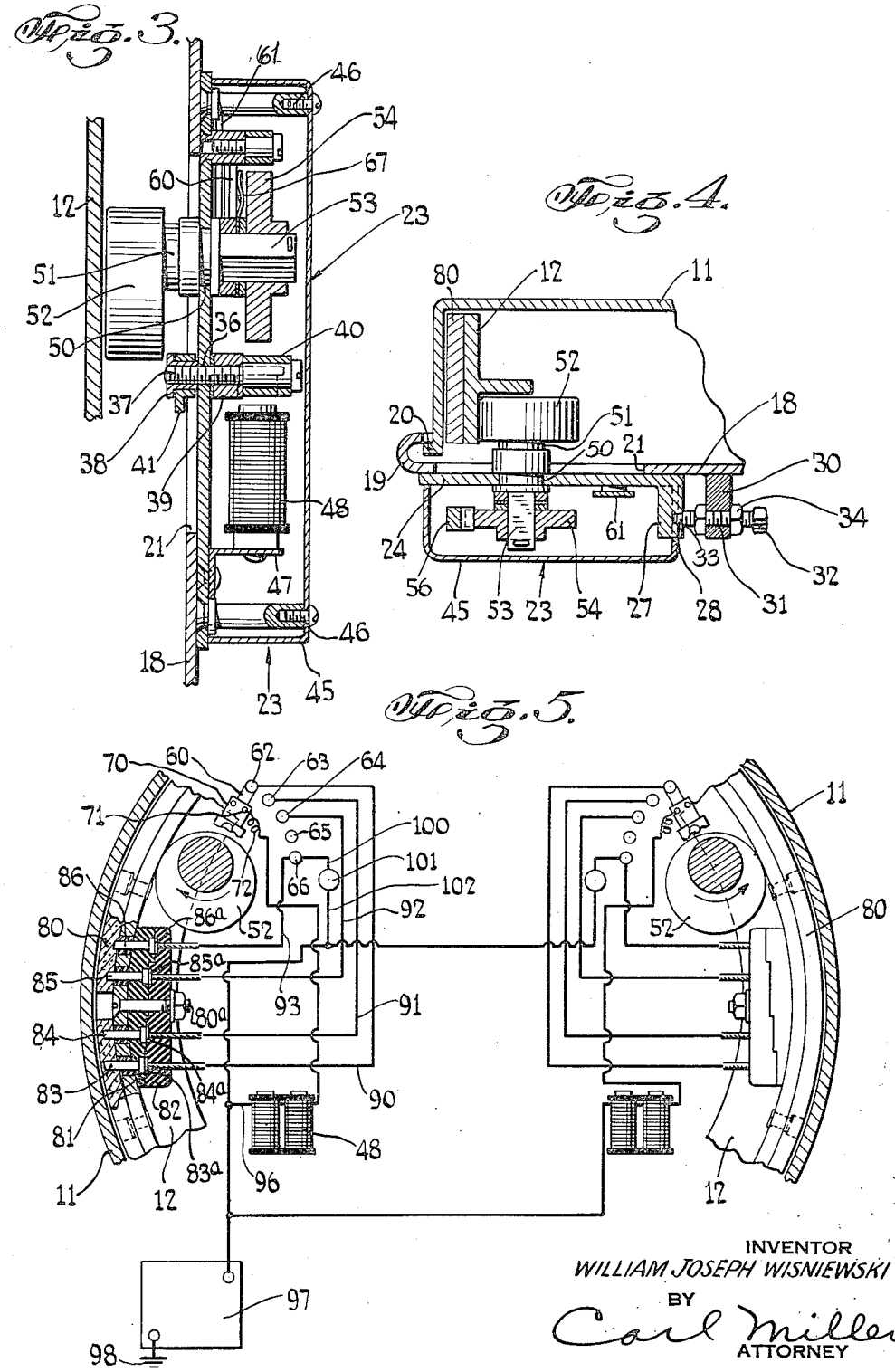
INVENTOR
WILLIAM JOSEPH WISNIEWSKI
BY
Carl Miller
ATTORNEY Patented Apr. 27, 1937

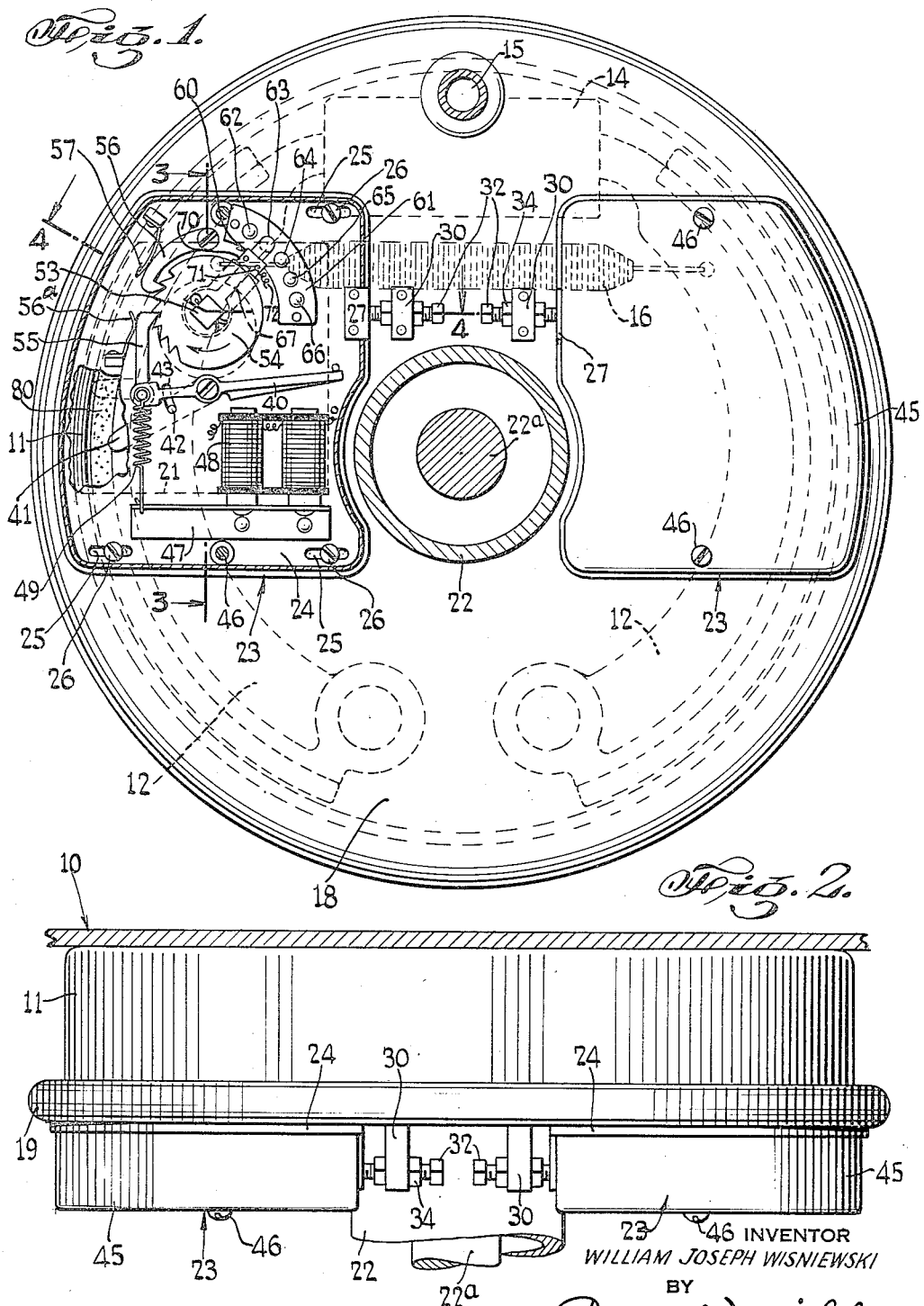

2,078,703

UNITED STATES PATENT OFFICE 2,078,703

VEHICLE BRAKE

William J. Wisniewski, Bayonne, N. J.

Application September 21, 1936, Serial No. 101,795

8 Claims. (Cl. 188—79.5)

This invention relates to vehicle brakes. It is particularly directed to means for automatically adjusting vehicle brakes as the brake lining wears.

It is well known that the lining on the brake shoes of the various brakes of a vehicle often wear unevenly. In such cases when the brakes are applied some brake shoes will grip before others preventing simultaneous application of the brakes. Furthermore, the brake shoes and brake drums often become worn due to the fact that one or more of the brake linings has worn down completely without the operator being aware of the fact. It is therefore an object of this invention to provide highly improved automatic brake adjusting means to automatically adjust each brake shoe as the brake lining wears to keep all the brake shoes in proper position with respect to the brake drum.

A further object of this invention is to provide signal means for automatically notifying the operator when each of the brake linings has been worn down to a predetermined point requiring replacement.

A further object of this invention is to provide compact and durable brake adjusting mechanism of the character described, which shall be relatively inexpensive to manufacture, positive in operation, and, withal, practical and efficient to a high degree in use.

Other objects of this invention will in part be obvious and in part hereinafter pointed out.

The invention accordingly consists in the features of construction, combination of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a brake embodying the invention with parts in cross section;

Fig. 2 is a top plan view of the structure shown in Fig. 1;

Fig. 3 is a cross-sectional view taken on line 3—3 of Fig. 1;

Fig. 4 is a cross-sectional view taken on line 4—4 of Fig. 1; and

Fig. 5 is an elevational view of a portion of the brake drum and illustrating the electrical control system in diagrammatic form.

Referring now in detail to the drawings, 10 designates a portion of a wheel of a vehicle, such as an automobile, to which is bolted a brake drum 11 in the usual well known manner. Within the brake drum 11 are a pair of symmetrical, pivoted brake shoes 12 adapted to be actuated by conventional hydraulic means, not shown in detail, but including the usual cylinder 14 communicating with an oil conduit 15 and provided with the usual pistons for spreading the brake shoes. A coil tension spring 16 serves to draw the brake shoes together in the usual manner.

Covering the open side of the brake drum 11 is a plate 18 having a peripheral bead 19 engaging the rim 20 of the brake drum. The cover plate 18 is formed from a pair of similar, symmetrically disposed openings 21 on opposite sides of the shaft or axle housing 22 for shaft 22a. Mounted on said cover plate 18 on opposite sides of the shaft housing and covering the openings 21 are a pair of similar, symmetrically disposed boxes 23. Each box 23 comprises a plate 24 closing an opening 21 and having a plurality of horizontal slots 25 at top and bottom receiving therethrough set-screws 26 screwed to the cover plate 18. By loosening the set-screws 26 the plate 24 may be adjusted horizontally. Each plate 24 has a projection 27 formed with a socket opening 28. On the cover plate 18 are a pair of parallel, aligned, fixed blocks 30 disposed between openings 21, formed with aligned through openings 31 each receiving a screw 32 having one end 33 received within the socket opening 28 of one of the projections 27. A pair of lock nuts 34 on each screw, disposed on opposite sides of block 30, serve to fix the screw 32 in any adjusted position to which it is moved, whereby the plate 24 may be moved likewise to adjusted position. Each plate 24 is furthermore formed with an opening 36 receiving therethrough a screw 37 fixed to the plate by a bushing 38 within the brake drum and a collar 39 within box 23.

Rotatably mounted on a smooth portion of the screw 37 is an armature lever 40. Loosely mounted on the bushing 38 is a gauge finger 41. A pin 42 on the gauge finger 41 extends through an arcuate slot 43 in the plate 24. The finger 41 may be moved normally from the full line position of Fig. 1 to the horizontal dotted line position of Fig. 1, the slot 43 limiting the angular movement of said finger. Upon moving the finger 41 to the dotted line, horizontal position, and moving the plate 24 to the left until the finger touches the inner surface of the brake drum, the box 23 will be properly located. The box may be fixed as described above by properly manipulating the screws 26 and 32 and the lock nuts 34. Plates 24 are covered by covers 45 fixed to said plate by transverse screws 46, or in any other suitable manner.

Fixed to each plate 24 and located within each box 23, is a horizontal shelf or bracket 47 and mounted on each shelf are a pair of electromagnets 48 adapted to attract, when energized, the armature lever 40. A coil compression spring 49 interconnects each shelf 47 with the lever 40 to raise the armature above the electromagnets 48 when the latter are deenergized. Each plate 24 is furthermore formed with an opening 50 rotatably supporting a shaft 51. On each shaft 51 is an eccentric cam 52 located within the brake drum and adapted to engage a brake shoe. Each shaft 51 has a square portion 53 located within box 23. On each shaft portion 53 is a ratchet 54. A pawl 55 on the armature lever 40 is held in engagement with the teeth of said ratchet by a spring 56a fixed to the plate 24. There is furthermore pivoted to each plate 24 a holding pawl 56 adapted to engage the teeth of the ratchet 54 and held in engagement with said teeth by a spring 57. Fixed to the shaft 51 is a radial contact arm 60 having a conducting portion at its outer end.

Fixed to each plate 24 is an insulated, flat, arcuate contact plate 61 provided with a series of equi-angularly spaced contacts 62, 63, 64, 65, and 66. A spring 67 on shaft portion 53 serves to press the contact arm 60 toward plate 61 whereby the outer portion thereof, engages the contacts 62, 63, 64, and 65 when rotated, as will appear hereinafter. On the contact arm is an insulated block 70 carrying a terminal 71 connected to the outer conducting portion of the contact arm, and to which is connected a wire 72. Each time the magnets 48 are energized, in the manner explained below, the armature lever 40 will be pulled down for raising the pawl 55 to rotate the ratchet 54 one notch. When the electromagnets are deenergized, in the manner hereinafter appearing, the armature 40 will be released to permit the spring 49 to pull the pawl 55 downwardly. The pawl 56, however, holds the ratchet against retrograde movement. Each time the ratchet turns one notch, the eccentric 52 will likewise be turned or rotated for pressing the brake shoe outwardly, against the tension of the spring 16 which interconnects the brake shoes.

Each brake shoe 12 is provided with a brake lining 80. Fixed to each brake shoe, as by bolt 80a, are a pair of mating insulating blocks 81, 82. The block 81 supports a plurality of pins 83, 84, 85, and 86 of copper or other conducting material, each projecting substantially, radially into the lining and being insulated from the brake shoe. The pin 83, as shown in Fig. 5 of the drawings, projects furthest into the lining. The pin 84 projects a lesser distance; the pin 85 a still lesser distance, and the pin 86 a still lesser distance. When the brake lining 80 wears a predetermined amount, the pin 83 will first contact the brake drum 11. The insulating block 82 carries terminals 83a, 84a, 85a and 86a, engaging pins 83, 84, 85, and 86 respectively when the blocks are assembled and bolted to the shoe. The terminal 83a is connected by wire 90 to the contact 62. The terminal 84a is connected by wire 91 to the contact 63. The terminal 85a is connected by wire 92 to the contact 64 and the terminal 86a is connected by wire 93 to the contact 66.

The wire 72 interconnects the terminal 71 on the contact arm 60 with one side of the coils of the magnets 48. The coils of said magnets 48 are connected by wire 96 to one side of the battery 97, the other side of the battery being grounded as at 98. The contact 66 is connected by wire 100 to a lamp 101. The lamp 101 is connected by wire 102 to the battery 97.

It will be understood that the structure in each of the boxes 23 is similar and symmetrically disposed about the housing 22. The same mechanical and electrical elements are provided for each brake shoe as shown in Fig. 5 of the drawings. After the two boxes 23 have been properly adjusted on the brake drum and fixed in position and the vehicle is in operation, should one of the brake linings wear down sufficiently to a point where the pin 83 will contact the brake drum which is grounded, a circuit will be completed through the wire 90, contact 62, contact arm 60, terminal 71, wire 72, magnets 48 and battery 97, which is also grounded. Thereupon the electromagnets 48 will be energized to draw the armature 40 downwardly for rotating the ratchet one notch and hence rotating the eccentric 52 through a predetermined angle for pressing the brake shoe closer to the drum. However, when the ratchet turns, the contact arm 60 will move from the contact 62 to the contact 63.

As the contact arm 60 moves off the contact arm 62, the circuit through the magnets will be broken and the magnets deenergized and the armature 40 released, to permit the spring 49 to pull the pawl 55 downwardly. Upon further wear, should the pin 84 contact the drum, a circuit will be completed through the wire 91, contact 63, contact arm 60, wire 72, electromagnets 48 and battery 97, causing the armature to be again actuated and the eccentric 52 rotated through another predetermined angle for further pressing its brake shoe toward the brake drum. When the pin 85 contacts the brake drum, the circuit is completed through wire 92, contact 64, contact arm 60, wire 72, magnets 48 and battery 97, causing the ratchet and eccentric 52 to be again rotated through a predetermined angle. The contact arm will then be moved onto contact 65 which is dead. When the last pin 86 contacts the brake drum upon further wear, circuit is completed through wires 93 and 100, lamp 101, wire 102 and battery 97 for illuminating the lamp (which may be located on the dashboard of the automobile). Each lamp may be so marked as to indicate a different brake shoe so that the operator may be notified by the signal which brake shoe has been completely worn and needs relining.

Although my invention has been illustrated as applied to brakes of the hydraulic type, it will be understood that the improved automatic adjusting and signal means may be incorporated into mechanical, air or other types of brakes for vehicles or other rotary devices.

When the lining of any shoe is replaced, the blocks 81, 82 are removed and the worn pins 83, 84, 85, and 86 replaced by new pins. The blocks may then be reassembled and bolted to the brake shoe.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

The present application is a continuation-in-part of application bearing Serial No. 63,268, filed Feb. 10, 1936.

Having thus described my invention, I claim as new and desire to secure by Letters Patent:

1. In combination, a brake drum, a brake shoe pivoted therein, manually controlled means for actuating said brake shoe, a lining on said shoe, a plurality of conductors on said shoe insulated therefrom and projecting into said lining varying distances, and means for progressively pressing said shoe against the inner cylindrical surface of said shoes as the lining wears, to permit progressive contact of the conductors with said inner surface.

2. In combination, a brake drum, a brake shoe pivoted therein, manually controlled means for actuating said brake shoe, a lining on said shoe, a plurality of conductors on said shoe insulated therefrom and projecting into said lining varying distances, means for progressively pressing said shoe against the inner cylindrical surface of said shoes as the lining wears, to permit progressive contact of the conductors with said inner surface, said means including a cam on said brake drum, a ratchet rotatable therewith, an electromagnet in circuit with said conductors, and means controlled by said electromagnet for rotating said ratchet.

3. In combination, a brake drum, a brake shoe pivoted therein, manually controlled means for actuating said brake shoe, a lining on said shoe, a plurality of conductors on said shoe insulated therefrom and projecting into said lining varying distances, means for progressively pressing said shoe against the inner cylindrical surface of said shoes as the lining wears, to permit progressive contact of the conductors with said inner surface, and electric signal means adapted to be actuated when one of said conductors contacts the inner surface of said drum.

4. In a vehicle, a battery grounded to said vehicle, a brake drum, a shoe therein, a lining on said shoe, a plurality of conductors on said shoe and insulated therefrom and projecting into said lining varying distances, a shaft on said drum, a cam on said shaft adapted to engage said shoe, a ratchet on said shaft, an electromagnet in said drum, an armature for said magnet carrying a pawl adapted to rotate said ratchet upon energizing said electromagnet, an insulated plate on said brake drum having a plurality of spaced contacts, each contact being electrically connected to one of said conductors, an arm on said shaft having a conducting portion adapted to engage said contacts as said arm rotates with said shaft, means for electrically connecting said portion of said arm to the coils of said magnet, said coils being connected to the line side of said battery.

5. In a vehicle, a battery grounded to said vehicle, a brake drum, a shoe therein, a lining on said shoe, a plurality of conductors on said shoe and insulated therefrom and projecting into said lining varying distances, a shaft on said drum, a cam on said shaft adapted to engage said shoe, a ratchet on said shaft, an electromagnet in said drum, an armature for said magnet carrying a pawl adapted to rotate said ratchet upon energizing said electromagnet, an insulated plate on said brake drum having a plurality of spaced contacts, each contact being electrically connected to one of said conductors, an arm on said shaft having a conducting portion adapted to engage said contacts as said arm rotates with said shaft, means for electrically connecting said portion of said arm to the coils of said magnet, said coils being connected to the line side of said battery, and an electric signal device connected to the line side of said battery and to the pin which projects least into said lining.

6. In combination, a brake drum, a cover plate for said drum fixed thereto, a brake shoe in said drum, a lining on said shoe, said cover plate having an opening, a second plate for covering said opening, means for fixing said second plate to said cover plate in various adjusted positions, a shaft on said second plate, a cam on said shaft adapted to engage said shoe, and means controlled by the degree of wear of said lining for rotating said shaft.

7. In combination, a brake drum, a cover plate for said drum fixed thereto, a brake shoe in said drum, a lining on said shoe, said cover plate having an opening, a second plate for covering said opening, means for fixing said second plate to said cover plate in various adjusted positions, a shaft on said second plate, a cam on said shaft adapted to engage said shoe, means controlled by the degree of wear of said lining for rotating said shaft, and means for gauging the position of said second plate relative to said drum.

8. In combination, a brake drum, a cover plate for said drum fixed thereto, a brake shoe in said drum, a lining on said shoe, said cover plate having an opening, a second plate for covering said opening, means for fixing said second plate to said cover plate in various adjusted positions, a shaft on said second plate, a cam on said shaft adapted to engage said shoe, means controlled by the degree of wear of said lining for rotating said shaft, and electric signal means to indicate a predetermined degree of wear of said lining.

WILLIAM J. WISNIEWSKI.